(12) United States Patent
Guo

(10) Patent No.: US 10,110,107 B2
(45) Date of Patent: Oct. 23, 2018

(54) LINEAR VIBRATION MOTOR

(71) Applicant: Shun Guo, Shenzhen (CN)

(72) Inventor: Shun Guo, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 168 days.

(21) Appl. No.: 15/417,090

(22) Filed: Jan. 26, 2017

(65) Prior Publication Data

US 2018/0115229 A1    Apr. 26, 2018

(30) Foreign Application Priority Data

Oct. 25, 2016 (CN) .................. 2016 2 1163513 U

(51) Int. Cl.
| | |
|---|---|
| H02K 33/00 | (2006.01) |
| H02K 33/02 | (2006.01) |
| H02K 5/04 | (2006.01) |
| H02K 1/34 | (2006.01) |

(52) U.S. Cl.
CPC .............. H02K 33/02 (2013.01); H02K 1/34 (2013.01); H02K 5/04 (2013.01)

(58) Field of Classification Search
CPC ............. H02K 1/34; H02K 5/04; H02K 33/02

USPC ............................. 310/15, 25, 12.01–12.33
See application file for complete search history.

(56) References Cited

U.S. PATENT DOCUMENTS

| | | | |
|---|---|---|---|
| 9,614,425 B2* | 4/2017 | Jin ...................... | H02K 33/16 |
| 9,912,217 B2* | 3/2018 | Xu ...................... | H02K 33/16 |
| 2017/0033672 A1* | 2/2017 | Xu ...................... | H02K 33/16 |
| 2018/0026508 A1* | 1/2018 | Guo ..................... | H02K 1/17 |
| | | | 310/12.22 |
| 2018/0026514 A1* | 1/2018 | Mao ................... | H02K 41/0354 |
| | | | 310/12.16 |
| 2018/0166961 A1* | 6/2018 | Guo ..................... | H02K 33/18 |

* cited by examiner

*Primary Examiner* — Thanh Lam
(74) *Attorney, Agent, or Firm* — Na Xu; IPro, PLLC

(57) ABSTRACT

A linear vibration motor includes a housing with an accommodation space; a vibration system in the accommodation space; an elastic part supporting the vibration system; and a magnetic circuit system with a magnetic gap for driving the vibration system to vibrate. The vibration system includes a connecting part including a first support portion, a plurality of second support portions extending respectively from the first support portion for fixing the weights, a coil suspended by the elastic part in the magnetic gap, two weights located symmetrically about the coil and fixed by the connecting part, and at least two clamping portions extending from the first support portion and connected respectively to two weights at the side near the coil for limiting the movement of two weights relative to the coil.

10 Claims, 3 Drawing Sheets

LINEAR VIBRATION MOTOR

FIELD OF THE INVENTION

The present disclosure relates to the vibration motors, and more in particularly to a linear vibration motor used in portable electronic product.

DESCRIPTION OF RELATED ART

In process of fast development of portable products, such as mobile phone, the functional requirement is much higher. In order to make the mobile phone more interesting in musical enjoyment, the music vibrating mode is invented and the linear vibration motor is developed fast also.

The linear vibration motor in relevant technology includes a vibration system, a magnetic circuit system with a magnetic gap to drive the vibration system and an elastic part which suspends the vibration system. The vibration system includes a coil suspended in the magnetic gap, two weights located respectively at both sides of the coil and a connecting part to fix two weights.

However, in the related linear vibration motor, as the connecting part is fixed on the surface of the weight only by soldering and other similar method, the connected area is small and the connecting strength is limited. When the linear vibration motor drops, especially drops in a direction from one weight to another weight, the connected area between the connecting part and the weight may be loose, misplaced or cracked, the reliability of the linear vibration motor is reduced or even the linear vibration motor fails.

Thereof, it is necessary to disclose an improved linear vibration motor.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby are only to explain this disclosure, not intended to limit this disclosure.

Figure 1:
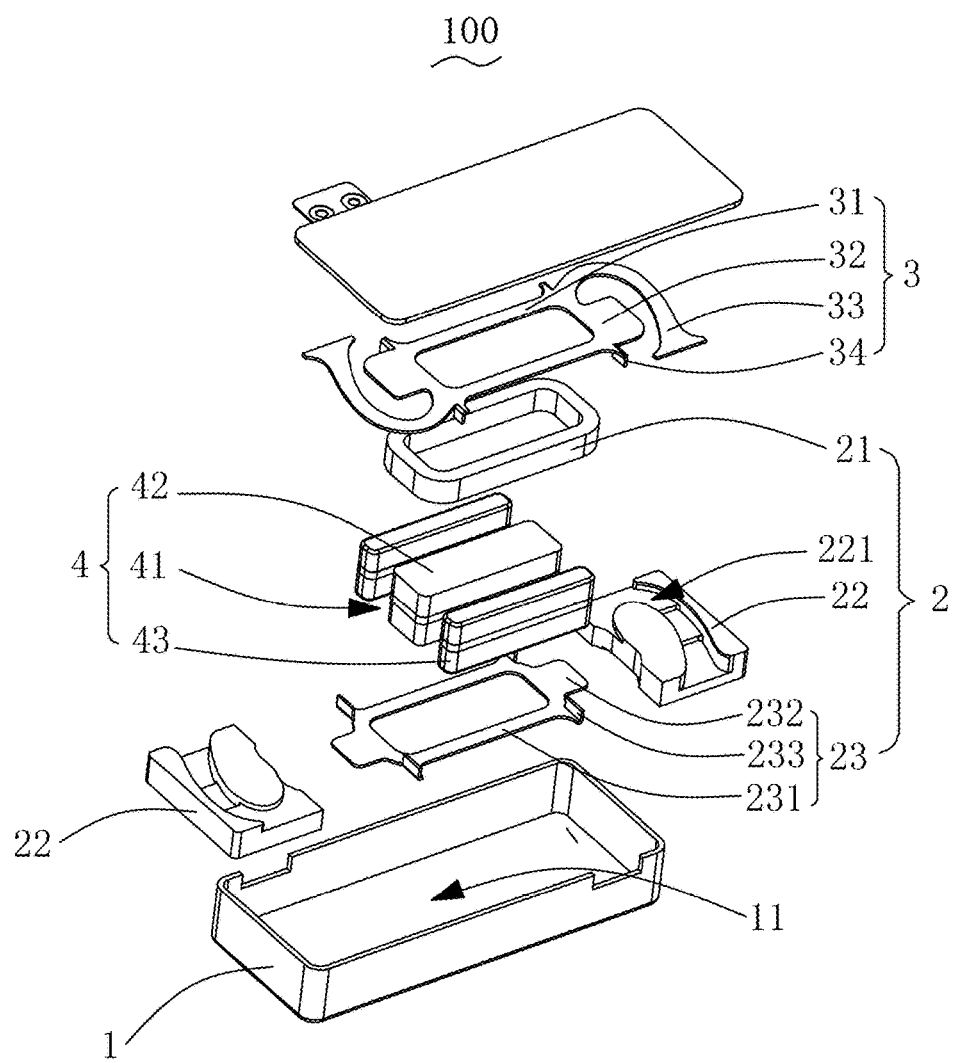
FIG. 1 is an isometric and exploded view of a linear vibration motor in accordance with an exemplary embodiment of the present disclosure.
Figure 2:
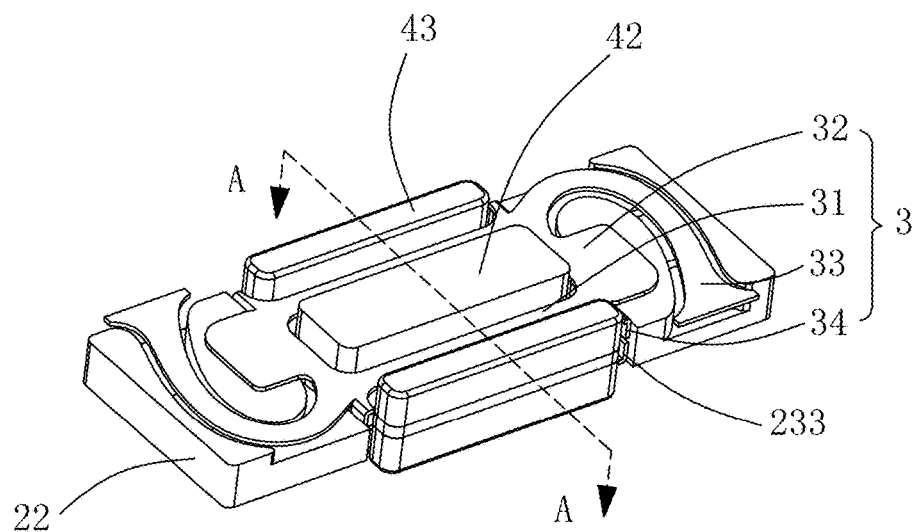
FIG. 2 is an isometric view of a part of the linear vibration motor in FIG. 1.
Figure 3:
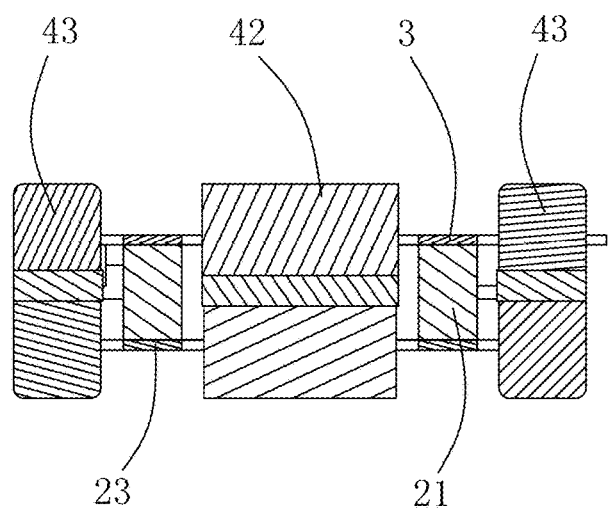
FIG. 3 is a cross-sectional view of the linear vibration motor taken along line A-A in FIG. 2.

Referring to FIGS. 1-3, a linear vibration motor 100 in accordance with an exemplary embodiment of the present disclosure, includes a housing 1 with an accommodation space 11, a vibration system 2 installed in the accommodation space 11, an elastic part 3 which suspends the vibration system 2 in the accommodation space 11 and a magnetic circuit system 4 to drive the vibration system 2 to vibrate. The magnetic circuit system 4 is provided with a magnetic gap 41.

The vibration system 2 includes a coil 21 which is suspended by the elastic part 3 in the magnetic gap 41, two weights 22 located respectively on both sides of the coil 21 (namely two weights 22 are located symmetrically to the coil), and a connecting part 23 which connects two weights 22 firmly. The coil 21 is clamped between the elastic part 3 and the connecting part 23.

Figure 4:
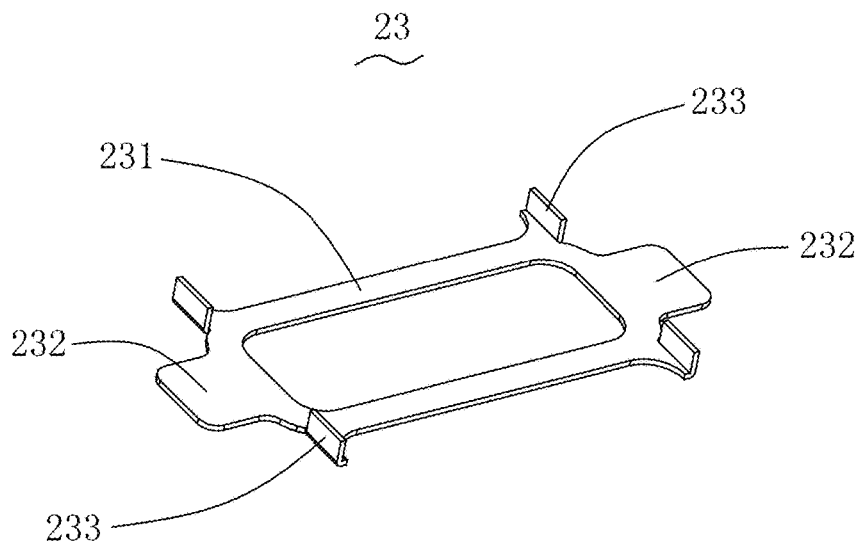
FIG. 4 is an illustrative and isometric view of a connecting part of the linear vibration motor.

Referring to FIG. 4, the connecting part 23 includes a first support portion 231 in ring shape, a second support portion 232 which are extended respectively from the first support portion 231 to fix the weights 22. At least two clamping portions 233 are extended by bending from the first support portion 231 to limit the movement of two weights 22 toward the coil 21. Two weights 22 are fixed respectively on two second support portions 232. Two clamping portions 233 are connected respectively to two weights 22 at the side near the coil 21, thereby forming a limit position of the weight 22. One end of the coil 21 is fixed on the first support portion 231. Certainly, the coil 21 can also be separated from the first support portion 231.

In this embodiment, the clamping portion 233 and the weight 22 are fixed firmly. This structure adds the limit role of the clamping portion 233 to the weights 22, namely increases the impact resistance at the connected area between the connecting part 23 and the weight 22. Optionally, the clamping portion 233 is soldered on the weights 22.

When the weight 22 is impacted, especially when the motor drops in a direction from one weight 22 to another weight 22, the clamping portion 233 shares maximally the impact force, so that the impact force on the connected area between the weight 22 and the second support portion 232 is reduced greatly, namely, the impact force on the connected area between the weight 22 and the connecting part 23 is reduced greatly, thereby avoiding the falling off or cracking of the connected area between the weight 22 and the connecting part 23, improving the reliability of the linear vibration motor 100.

In this embodiment, 4 clamping portions are disposed equally on the first support portion 231 respectively close to both sides of two weights 22. Each second support portion 232 is located respectively between two clamping portions 233. Certainly, the quantity of the clamping portion 233 is not limited to 4. The principle is same.

Figure 5:
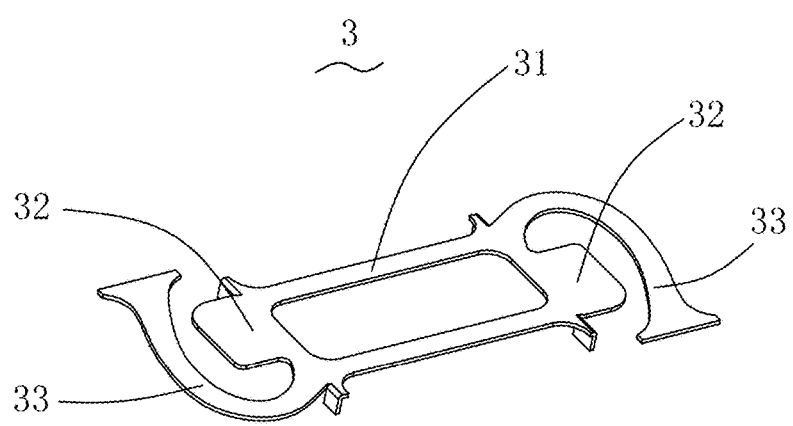
FIG. 5 is an illustrative and isometric view of an elastic part of the linear vibration motor.

Referring to FIG. 5, the elastic part 3 includes a ring-shaped main portion 31 and fixation parts 32 extending from the main portion 31 respectively and fixed on the weights 22. Two elastic arms 33 extend respectively from the main portion 31. At least two retaining arms 34 extend by bending from the main portion 31 to limit the moving direction of two weights 22 to the coil. The main portion 31 is connected firmly with the coil 21. The weights 22 are provided with an accommodation space 221. The elastic arms 33 are located in the accommodation space 221 and the end of the elastic arm 33 is fixed on the housing 1. Thereby, the coil 21 and the weight 22 are suspended in the accommodation space 11 by the elastic arm 33 (i.e. by the elastic part 3) and the coil 21 can vibrate up and down. The weight 22 is the counterweight of the coil 21 for increasing the vibratory force of the coil 21. The retaining arm 34 is connected respectively to the weights 22 at the side near the coil 21, forming a limit to the weight 22, thereby shares part of the impact force for the weight 22. The impact resistance ability on the connected area between the weight 22 and the connecting part 23 is increased greatly.

Optionally, the second support portion 232 of the connecting part 23 and the fixation portion 32 of the elastic part 3 are fixed respectively on both sides of the weight 22.

In this embodiment, the retaining arm 34 is connected firmly with the weight 22. Optionally, the retaining arm 34 is soldered on the weight 22. This structure adds the limit role of the retaining arm 34 to the weights 22, namely increases the impact resistance at the connected area between the connecting part 23 and the weight 22, and improves the reliability of the linear vibration motor 100.

Specifically, four retaining arms 34 are distributed equally on the main portion 31 respectively close to both sides of two weights 22. Each fixation portion 32 is located respectively between two retaining arms 34. Same as above, the quantity of the retaining arms 34 is not limited to 4. The principle is same.

The magnetic circuit system 4 is fixed on the housing 1, including a main magnet unit 42 and an auxiliary magnet unit 43 surrounding the main magnet unit 42 and forming the magnetic gap 41 with the main magnet unit 42. The first support portion 231, the coil 21 and the main portion 31 are installed respectively in the main magnet unit 42 and located inside the magnetic gap 41.

When the magnetic circuit system 4 vibrates the coil 21 up and down, the coil 21 is supported by the elastic part 3 and vibrates together with the weight 22, thereby increasing the vibratory force of the vibration system 2.

The following notes should be explained here. It is easy to understand according to the structure described above that the linear vibration motor 100 disclosed by the present disclosure can be realized actually by following three modes:

The connecting part 23 is provided with the clamping portion 233. The clamping portion is connected or fixed to the weights 22.

Or, the elastic part 3 is provided with the retaining arm 34. The retaining arm 34 is connected or fixed to the weight 22.

Or, the connecting part 23 is provided with the clamping portion 233. The clamping portion is connected or fixed to the weight 22. The elastic part 3 is provided also with the retaining arm 34. The retaining arm 34 is connected or fixed to the weight 22.

Compared with the existing technology, in the linear vibration motor disclosed in the present utility model, several clamping portions are extended by bending respectively to both sides of the first support portion on the connecting part. The clamping portion is connected respectively to two weights at the side near the coil, effectively sharing the impact force when the weight drops, and greatly reducing the looseness or crack on the connected area between the connecting part and the weight in drop, thereby improving the reliability of the linear vibration motor.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A linear vibration motor, including:
a housing with an accommodation space;
a vibration system in the accommodation space;
an elastic part supporting the vibration system;
a magnetic circuit system with a magnetic gap for driving the vibration system to vibrate; wherein
the vibration system includes:
a connecting part including a first support portion, a plurality of second support portions extending respectively from the first support portion for fixing the weights;
a coil suspended by the elastic part in the magnetic gap, the coil being clamped between the elastic part and the connecting part;
two weights located symmetrically about the coil and fixed by the connecting part; and
at least two clamping portions extending from the first support portion and connected respectively to two weights at the side near the coil for limiting the movement of two weights relative to the coil.

2. The linear vibration motor as described in claim 1, wherein the clamping portion and the weights are fixed firmly.

3. The linear vibration motor as described in claim 2, wherein the clamping portion is soldered on the weights.

4. The linear vibration motor as described in claim 1 including four clamping portions located on both sides of the first support portion near the weights, wherein the second support portion is located between two clamping portions.

5. The linear vibration motor as described in claim 4, wherein the coil is fixed on the first support portion.

6. The linear vibration motor as described in claim 1, wherein the elastic part includes a ring main portion extending respectively and fixed on the fixation portion of the weights, two elastic arms extending respectively from the main portion, at least two retaining arms extending from the main portion for limiting the moving direction of two weights.

7. The linear vibration motor as described in claim 6, wherein the main portion is connected firmly with the coil, the weights are provided with accommodation space for accommodating the elastic arms; an end of the elastic arm is fixed on the housing and the retaining arm is connected respectively to two weights at the side near the coil.

8. The linear vibration motor as described in claim 7, wherein the retaining arm is connected firmly with the weights.

9. The linear vibration motor as described in claim 8, wherein four retaining arms are provided to be located respectively on both sides of the main portion near the weights, the fixation portion is located between two retaining arms.

10. The linear vibration motor as described in claim 1, wherein the magnetic circuit system fixed on the housing includes a main magnet unit, an auxiliary magnet unit surrounding the main magnet unit and forming the magnetic gap with the main magnet unit, and a first support portion, the coil and the main portion are installed respectively in the main magnet and located inside the magnetic gap.

* * * * *